(12) United States Patent
Girnus et al.

(10) Patent No.: US 12,018,731 B2
(45) Date of Patent: Jun. 25, 2024

(54) CRANKSHAFT ASSEMBLY COMPRISING A CENTERED VIBRATION DAMPER

(71) Applicant: Schaeffler Technologies AG & Co. KG, Herzogenaurach (DE)

(72) Inventors: Mathias Girnus, Bühl (DE); Pascal Strasser, Aschbach (FR)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/031,444

(22) PCT Filed: Sep. 3, 2021

(86) PCT No.: PCT/DE2021/100727
§ 371 (c)(1),
(2) Date: Apr. 12, 2023

(87) PCT Pub. No.: WO2022/078541
PCT Pub. Date: Apr. 21, 2022

(65) Prior Publication Data
US 2023/0407942 A1    Dec. 21, 2023

(30) Foreign Application Priority Data
Oct. 14, 2020  (DE) ...................... 10 2020 127 008.9

(51) Int. Cl.
  *F02B 75/06*   (2006.01)
  *F16C 3/06*    (2006.01)
  *F16F 15/14*   (2006.01)

(52) U.S. Cl.
  CPC .............. *F16F 15/145* (2013.01); *F16C 3/06* (2013.01); *F16F 2222/08* (2013.01);
  (Continued)

(58) Field of Classification Search
  CPC .. F16F 15/145; F16F 2232/02; F16F 2236/08; F16D 3/12; F16D 2300/22; F16C 3/20
  (Continued)

(56) References Cited

U.S. PATENT DOCUMENTS 2,585,382 A     2/1952 Guernsey
2019/0170211 A1*  6/2019 Bouche ................. F16F 15/145
(Continued)

FOREIGN PATENT DOCUMENTS

DE       19949206 A1    4/2000
DE       10114610 A1    10/2002
(Continued)

*Primary Examiner* — Long T Tran
*Assistant Examiner* — James J Kim

(57) ABSTRACT

The disclosure relates to a crankshaft assembly for an internal combustion engine of a motor vehicle, comprising a crankshaft segment and a vibration damper accommodated on the crankshaft segment. The vibration damper has a support fastened to the crankshaft segment and a damping unit accommodated on the support. A retaining plate of the support, which plate is secured to an end face of a flange region of the crankshaft segment, has a screw receiving hole for receiving a fastening screw that connects the support to the crankshaft segment. The retaining plate also has a centering region that is offset relative to the screw receiving hole in a circumferential direction and is intended to accommodate, or so as to directly form, a centering means supporting the support relative to the crankshaft segment in a centered manner.

20 Claims, 5 Drawing Sheets

(52) U.S. Cl.
CPC ... *F16F 2226/04* (2013.01); *F16F 2230/0005* (2013.01); *F16F 2232/02* (2013.01); *F16F 2236/08* (2013.01)

(58) Field of Classification Search
USPC ...................................................... 123/192.1
See application file for complete search history.

(56) References Cited

U.S. PATENT DOCUMENTS

| | | | | |
|---|---|---|---|---|
| 2020/0088264 | A1* | 3/2020 | Nakamura | F16F 15/1216 |
| 2020/0378448 | A1* | 12/2020 | Oi | F16F 15/13469 |
| 2021/0381556 | A1* | 12/2021 | Uehara | F16F 15/1207 |
| 2022/0205512 | A1* | 6/2022 | Nilsson | F16F 15/145 |

FOREIGN PATENT DOCUMENTS

| | | |
|---|---|---|
| DE | 102006043621 A1 | 4/2007 |
| DE | 102016121397 A1 | 5/2017 |
| DE | 102021112860 A1 | 12/2021 |
| EP | 1626199 A1 | 2/2006 |
| WO | 2015188821 A1 | 12/2015 |

* cited by examiner

CRANKSHAFT ASSEMBLY COMPRISING A CENTERED VIBRATION DAMPER

CROSS-REFERENCE TO RELATED APPLICATIONS

This application is the U.S. National Phase of PCT Application No. PCT/DE2021/100727 filed on Sep. 3, 2021, which claims priority to DE 10 2020 127 008.9 filed on Oct. 14, 2020, the entire disclosures of which are incorporated by reference herein.

TECHNICAL FIELD

The disclosure relates to a crankshaft assembly for an internal combustion engine of a motor vehicle, such as a car, truck, bus or other commercial vehicle.

BACKGROUND

It is already well known from the prior art to attach vibration dampers directly to the crankshaft to absorb natural frequency vibrations. For example, DE 10 2016 121 397 A1 discloses a pendulum arrangement radially attached to an outer circumferential surface of the crankshaft.

However, in designs known from the prior art, it has been found that an interface between the crankshaft and the vibration damper accommodated thereon is often relatively complex in design. This is because the existing fastening means and the means of centering the vibration damper relative to the crankshaft are costly to manufacture. Furthermore, the interfaces take up a relatively large amount of installation space.

SUMMARY

It is therefore the object of the present disclosure to provide a crankshaft assembly in which the vibration damper is accommodated in a space-saving manner and by simple means, while ensuring the least possible assembly effort required.

According to the disclosure, this object is achieved in that a retaining plate of the support, which plate is secured to an (axial) end face of a flange region of the crankshaft segment, has a screw receiving hole for receiving a fastening screw that connects the support to the crankshaft segment, and a centering region that is offset relative to the screw receiving hole in a circumferential direction and is intended to accommodate, or so as to directly form, a centering means supporting the support relative to the crankshaft segment.

Due to the connection of the retaining plate of the support, a compact unit is implemented, in particular in the axial direction. The simultaneous fastening and centering of the vibration damper to the crankshaft segment further simplifies the structure of the crankshaft assembly.

Further advantageous embodiments are explained in more detail below.

Accordingly, it is further advantageous if the vibration damper is designed as a centrifugal pendulum. This effectively dampens the resonant vibrations that occur during operation.

It is also advantageous if the support, forming a central passage, has a horseshoe-shaped extension (in the circumferential direction), wherein the support is axially (centrally) penetrated by a shaft section of the crankshaft segment. This allows the vibration damper to be used in a space-saving manner to compensate for imbalances arising during operation. This advantage can be further amplified if the support is attached to a cheek of the crankshaft segment.

If the support is arranged at a radial distance from a radial outer lateral surface of the (cylindrical) shaft section, the structure and assembly of the vibration damper are further simplified.

Alternatively, it is also expedient if the support is in contact with the outer lateral surface at least in sections. This provides simple support for centering the vibration damper/support relative to the crankshaft segment.

In addition, it is advantageous if a cover is secured to the support, thus extending the functionality of the vibration damper in a simple manner. This cover can be used to accommodate a friction device of the damping unit. Further, the cover can serve as a burst protection, i.e. to radially cover the components of the vibration damper. This keeps the structure as simple as possible.

The support is used in an even more space-intensive manner if a receiving region connected to the cover is provided on the retaining plate offset relative to the screw receiving hole and/or the centering region in the circumferential direction.

If the receiving region is designed as an axial rivet projection or a through-hole, its structure is kept as simple as possible.

It has also proved advantageous if the fastening screw is supported with its screw head on the cover or directly on the support. When supported on the cover, it is supported in a sufficiently robust manner. When supported directly on the support, the connection between the support and the crankshaft segment is implemented in a manner that is as fatigue-resistant as possible.

For ease of manufacture, it has also been found beneficial if the centering region has a through-hole which is penetrated by a centering means anchored in the crankshaft segment, such as a centering screw, fitting screw or centering pin.

Alternatively or in addition to the design of the centering region as a through-hole in combination with a centering screw or fitting screw, it is also expedient if the fastening screw is implemented as a centering screw or as a fitting screw. This may allow for the number of fastening means/centering means provided to be reduced.

As an alternative to the design of the centering region as a female element, it is also expedient if the centering region has a male element with a centering nipple formed by means of forming technology and pressed into a receiving hole of the crankshaft segment. This allows the centering region to be formed as simply as possible. In an example embodiment, only a centering nipple and the receiving hole cooperating therewith (further implemented as a fitting hole) are provided.

The vibration damper, which can be implemented as a centrifugal pendulum, typically has at least one pendulum mass suspended in a pendulum-like manner in the centrifugal force field, which compensates for the resulting imbalances/vibrations during operation. A friction device can be further provided to act between the support and the pendulum masses to compensate for a relative movement.

As an alternative to the horseshoe-shaped extension, it is also advantageous if the support is designed to be completely circumferential/annular and the pendulum masses received on it are distributed evenly in the circumferential direction.

In other words, in accordance with the disclosure, a transverse force absorption is thus implemented by means of a centering device (centering region) in a centrifugal pendulum on a crankshaft. In an axial contact region between the crankshaft and the centrifugal pendulum support (the support), at least three, and further at least five, regions can be available for the required functions. The functions are, firstly, pre-riveting of the burst protection hood (cover) and centrifugal pendulum support flange (support), secondly, centering of the structure (via the centering region) on the crankshaft, and thirdly, screw connection of the structure (via a fastening screw) to the crankshaft. The centering can absorb the transverse forces and thus relieves the screw connection. This can be done by means of different methods: Centering nipples (at least one) which are formed from the centrifugal pendulum support flange and engage in fitting holes (the receiving hole) in the crankshaft; one or more fitting pins, a centering screw (for example according to DIN EN ISO 4028) or a fitting screw (for example according to DIN 609), which perform a screwing and centering function. The vibration damper can be arranged on a cheek forming a first cheek or a second cheek of the crankshaft.

BRIEF DESCRIPTION OF THE DRAWINGS

The disclosure can be explained in more detail with reference to drawings, in which context various exemplary embodiments are also shown.

In the figures.

DETAILED DESCRIPTION

The figures are only schematic in nature and serve only for understanding the disclosure. The same elements are provided with the same reference symbols.

Figure 1:
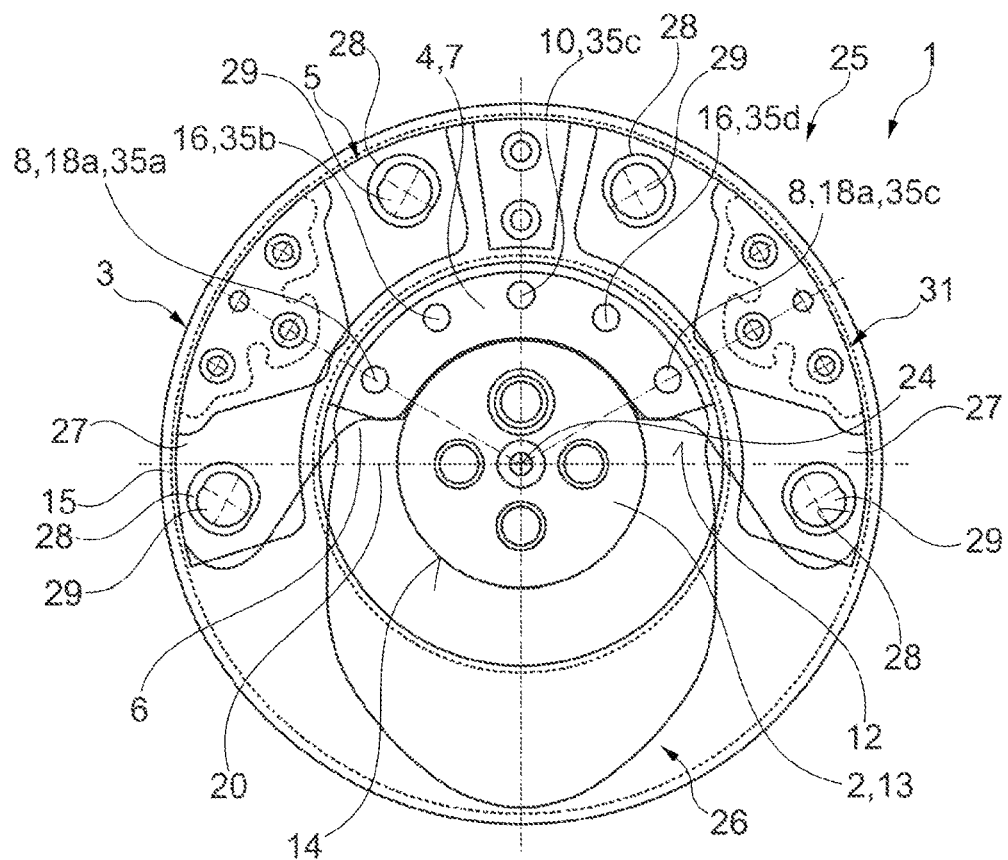
FIG. 1 shows a front view of a crankshaft assembly according to the disclosure according to a first exemplary embodiment, in which the attachment of a vibration damper to a crankshaft segment is clearly visible.

FIG. 1 clearly shows the overall structure of a crankshaft assembly 1 according to the disclosure according to a first exemplary embodiment. The crankshaft assembly 1 has a crankshaft segment 2 and a vibration damper 3 attached to it. The crankshaft segment 2 is designed in such a way that it can be attached/screwed to one end of a crankshaft for extending this crankshaft. In further embodiments, however, the crankshaft segment 2 is also implemented as a materially integral part of the crankshaft and is thus to be regarded as a section of the crankshaft.

With respect to the crankshaft segment 2, it can also be seen in FIG. 1 that it forms a shaft section 13 extending along a central axis of rotation 24 (corresponding to an axis of rotation of the crankshaft). This shaft section 13 extends in a substantially cylindrical manner, i.e. has a substantially cylindrical outer lateral surface 14.

For the sake of completeness, it should be noted that the direction indications "axial/axial direction", "radial/radial direction" and "circumferential direction" used here are intended to be viewed in relation to the central axis of rotation 24 of the crankshaft assembly 1. Consequently, "axially/axial direction" is to be understood as a direction along the axis of rotation 24; "radially/radial direction" is to be understood as a direction perpendicular to the axis of rotation 24; and "circumferential direction" is to be understood as a direction along a circular line that runs concentrically around the axis of rotation 24.

While FIGS. 1 to 5 illustrate the first exemplary embodiment of the crankshaft assembly 1 according to the disclosure, FIGS. 6 to 10 show further alternative exemplary embodiments, each based on the first exemplary embodiment. For the sake of brevity, therefore, only the differences between these exemplary embodiments will be described.

Figure 2:
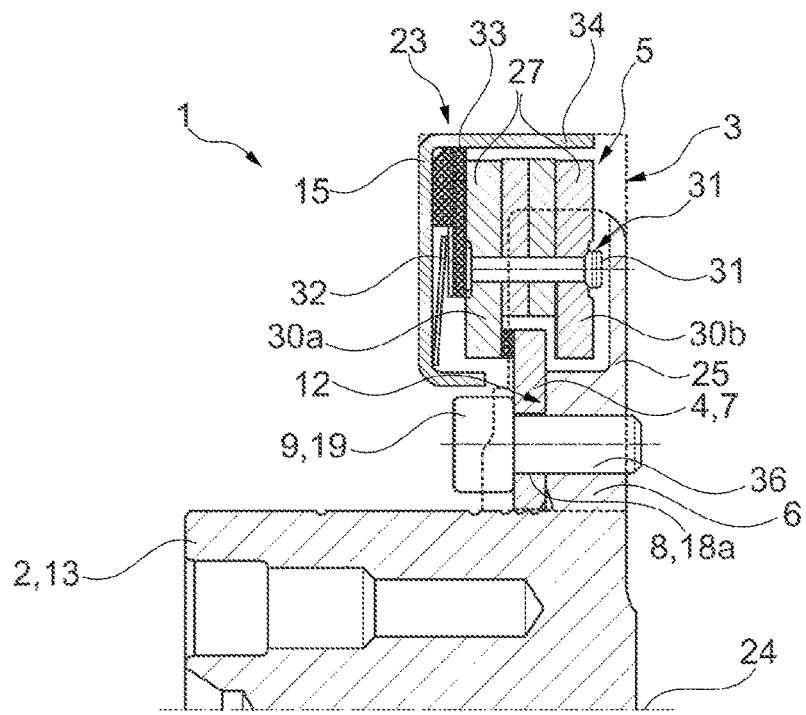
FIG. 2 shows a longitudinal sectional view of the crankshaft assembly according to FIG. 1, wherein a fastening screw connecting the support to the crankshaft segment can be seen.

With reference to the first exemplary embodiment, FIGS. 1 and 2 also illustrate that a (first) cheek 25 projects from the shaft section 13 in a circumferential region in the radial direction and is used directly to accommodate the vibration damper 3. This (first) cheek 25 is also to be regarded as the first cheek 25 of the crankshaft and is axially offset relative to another (second) cheek 26 (second cheek of the crankshaft). In FIG. 1, the first cheek 25 is arranged above the axis of rotation 24 with respect to a horizontally extending reference plane 20 (with its center of gravity), while the second cheek 26 is arranged below the axis of rotation 24 (with its center of gravity). In further embodiments, the vibration damper 3 is also alternatively accommodated on other cheeks, such as the second cheek 26.

In this embodiment, the vibration damper 3 is implemented as a centrifugal pendulum, but in further embodiments it can also be implemented in other ways.

The vibration damper 3 has a support 4 which is fastened directly to the crankshaft segment 2, namely to an (axial) end face 12 of the first cheek 25. The first cheek 25, as can also be seen in greater detail in FIG. 2, forms a flange region 6 to which the support 4 is screwed by means of a plurality of fastening screws 9 distributed in the circumferential direction.

A damping unit 5 of the vibration damper 3 is further accommodated on the support 4. In this embodiment, the damping unit 5 has more than one, namely two pendulum masses 27, which are accommodated on the support 4 so as to be relatively displaceable in the circumferential direction and in the radial direction via corresponding guide tracks 28 and guide pins 29. In operation, the pendulum masses 27 serve to compensate for resonant oscillations that occur by means of the performed pendulum motion in a typical manner.

FIG. 2 also shows that the respective pendulum mass 27 has several partial masses 30a, 30b which are connected to one another by a rivet connection 31.

In addition, a friction device 23 is present which is operatively inserted between the pendulum masses 27 and the support 4 (while damping a relative movement of the pendulum masses 27 relative to the support 4). A cover 15 (shown as transparent in FIG. 1) connected to the support 4 accommodates the friction device 23. The friction device 23 has a friction element 33 and a disk spring 32 axially applying/pressing the friction element 33 against the pendulum masses 27 (FIG. 2). The disk spring 32 and the friction element 33 can be connected to the cover 15 and thus to the support 4 in a non-rotatable manner.

Towards a radial outer side, the cover 15 has a collar region 34 which extends axially and covers/axially overhangs the pendulum masses 27 radially from the outside. As a result, the cover 15 is also designed as a burst protection, i.e. as protection against parts that may become detached during operation.

In conjunction with FIGS. 1 to 5, the fastening and centering of a radially inwardly projecting retaining plate 7 of the support 4 on the crankshaft segment 2 according to the disclosure is described below. According to FIG. 1, there are various, here five, circumferential positions 35a to 35e at which either fastening by the fastening screw 9, centering by a centering means 11 or receiving of the cover 15 occurs. The retaining plate 7 is a materially integral component of the support 4.

The support 4/the vibration damper 3 has the horseshoe-shaped extension clearly visible in FIG. 1. The retaining plate 7 even extends less than 180° around the axis of rotation 24, but in further embodiments it also extends more than 180° around.

The total of five existing circumferential positions 35a to 35e are designated according to their sequence in the circumferential direction and accordingly equipped with the various means in the following manner. The circumferential positions 35a to 35e, which follow one another in the circumferential direction according to their designation defined by the reference symbols, are designed according to the details of FIGS. 2 to 4.

The fastening screw 9 shown in FIG. 2 can be implemented at a first circumferential position 35a and a fifth circumferential position 35e. The retaining plate 7 has a screw receiving hole 8 for receiving the fastening screw 9 at the respective circumferential position 35a, 35e, which is designed as a (first) through-hole 18a.

A threaded section 36 of the fastening screw 9 is screwed into the crankshaft segment 2/the flange region 6 and fixes the support 4 axially to the retaining plate 7 via contacting of the screw head 19.

Figure 10:
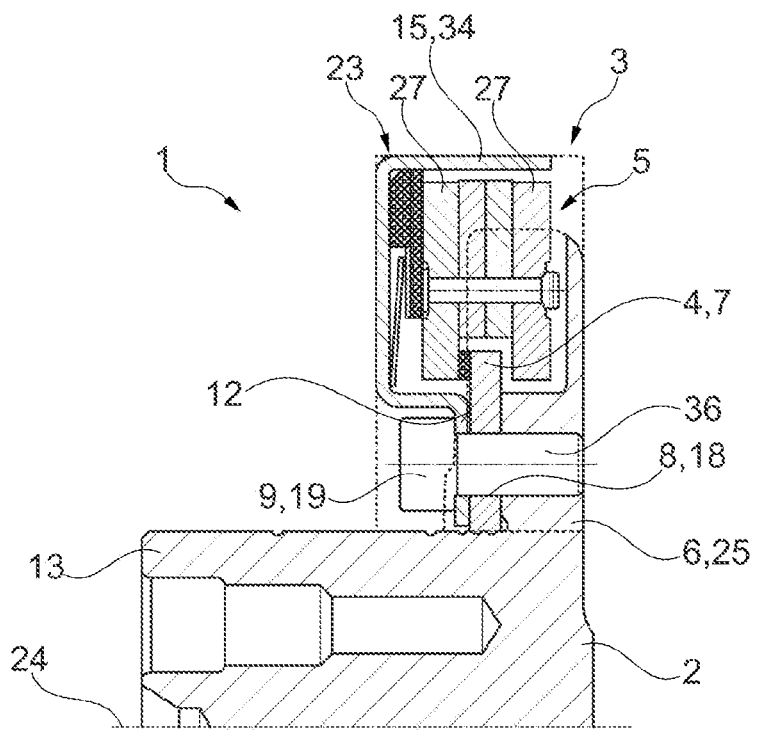
FIG. 10 shows a longitudinal sectional view of a crankshaft assembly according to the disclosure according to a sixth exemplary embodiment, wherein the cover is fastened to the support as well as the crankshaft segment by means of the fastening screw.

With regard to the attachment of the fastening screw 9, reference should also be made to the alternative implemented with the sixth exemplary embodiment of FIG. 10, in which the fastening screw 9 is alternatively used directly to secure the cover 15 on the part of the support 4 and thus on the part of the crankshaft segment 2. Accordingly, the screw head 19 of the fastening screw 9 no longer lies directly against the support 4, as in FIG. 2, but against the cover 15 and is therefore indirectly supported on the support 4.

Figure 4:
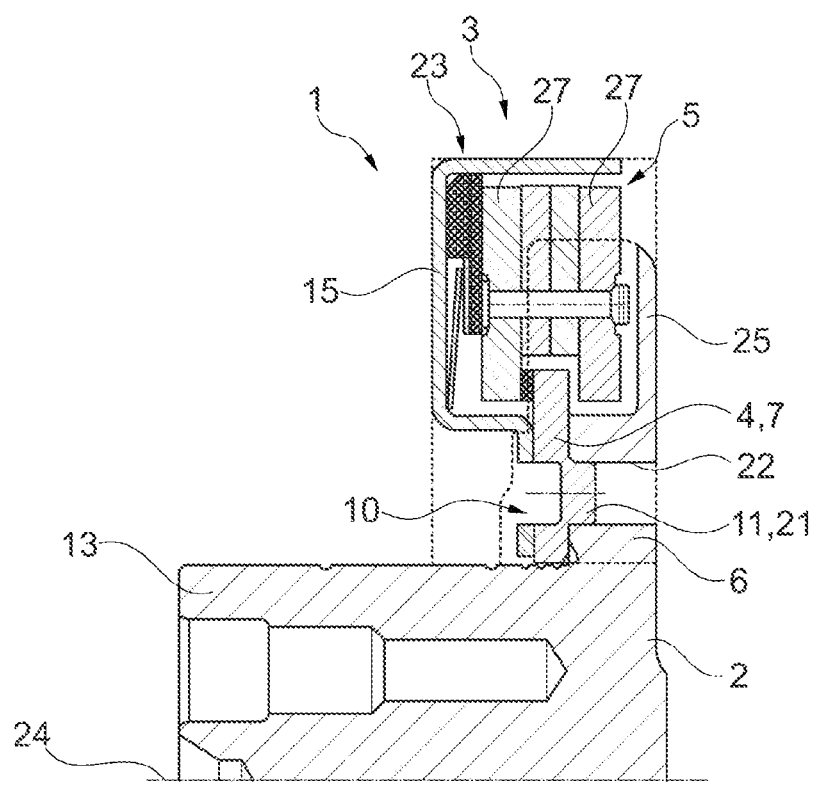
FIG. 4 shows a further longitudinal sectional view of the crankshaft assembly according to FIG. 1, wherein the sectional plane is now chosen in such a way that a centering region of the support can be seen, by means of which the support is supported in a centered manner relative to the crankshaft segment.

Returning to the first exemplary embodiment, FIGS. 1 and 4 further illustrate that the retaining plate 7 forms a centering region 10 at at least one further circumferential position, such as the central (third) circumferential position 35c, via which the support 4 is supported in a centered manner relative to the crankshaft segment 2, i.e. the axis of rotation 24.

In this embodiment, the centering region 10 is implemented as a male centering means 11 in the form of a centering nipple 21. The centering nipple 21 is produced by means of forming technology as a materially integral component of the support 4. The centering means 11 is pressed into a receiving hole 22 in the crankshaft segment 2 designed as a fitting hole. The centering region 10 is therefore used to secure the support 4 in a defined manner in the circumferential direction and in the radial direction on the crankshaft segment 2.

Figure 5:
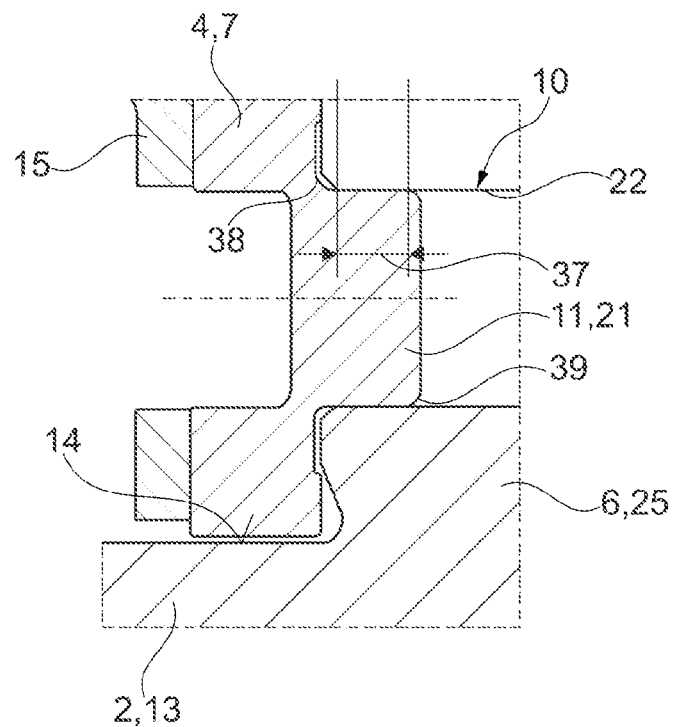
FIG. 5 shows a detailed view of the centering region according to FIG. 4, showing in more detail the dimensioning of a centering nipple forming this centering region and its accommodation in the crankshaft segment.

FIG. 5 shows in detail how the centering nipple 21 is formed and received in the receiving hole 22. A cylindrical (axial) portion 37 of the centering nipple 21 is pressed firmly into the receiving hole 22. Furthermore, a bevel 38 is provided on an axial side of the receiving hole 22 facing the retaining plate 7. A rounding 39 is also formed at the end of the centering nipple 21 projecting into the receiving hole 22.

Figure 3:
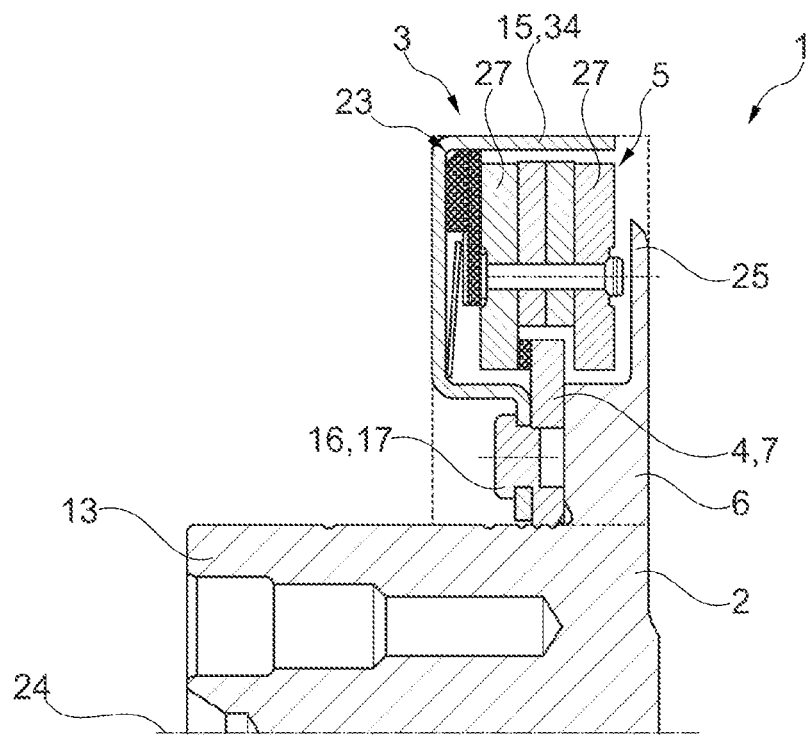
FIG. 3 shows a further longitudinal sectional view of the crankshaft assembly according to FIG. 1, wherein the sectional plane is offset relative to the sectional plane according to FIG. 2 in such a way that a receiving region of the support accommodating a cover can be seen.

FIGS. 1 and 3 further illustrate that in the first exemplary embodiment, the second and fourth circumferential positions 35b and 35d are implemented as a receiving region 16 to which the cover 15 is secured.

In FIG. 3, the respective receiving region 16 is implemented as an axial rivet projection 17, which is also formed/flared on the retaining plate 7 by means of forming technology, for example as a fastening nipple. This rivet projection 17 is flared from the support 4 towards a side facing away from the flange region 6.

Figure 6:
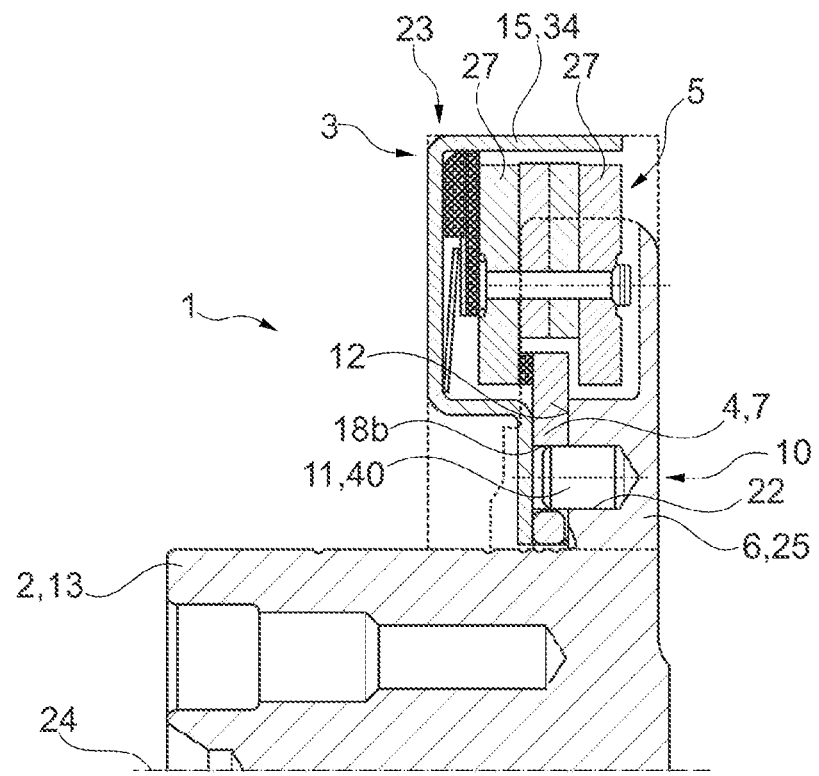
FIG. 6 shows a longitudinal sectional view of a crankshaft assembly according to the disclosure according to a second exemplary embodiment, wherein a centering pin centering the support relative to the crankshaft segment is now provided as a separate component from the support.

With the second exemplary embodiment according to FIG. 6, an alternative to the design of the centering means 11 as a centering nipple 21 is shown. According to this, the support 4 and the crankshaft segment 2 are supported in a centered manner relative to one another via a centering pin 40 formed separately to the support 4 and the crankshaft segment 2. The support 4 is thus centered by pressing the centering pin 40 both into a (second) through-hole 18b of the retaining plate 7 forming the centering region 10 and into the receiving hole 22 of the crankshaft segment 2.

Figure 7:
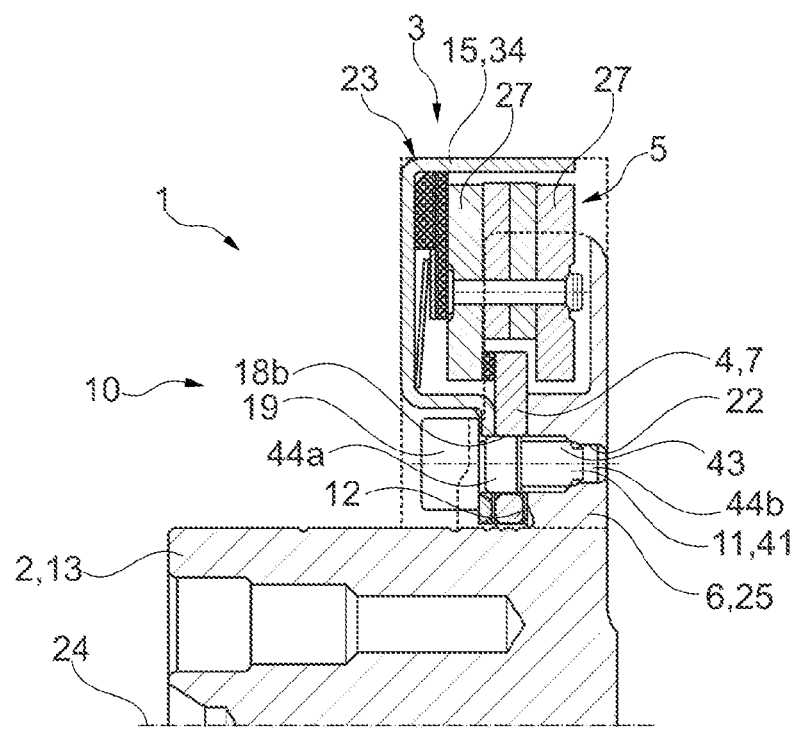
FIG. 7 shows a longitudinal sectional view of a crankshaft assembly according to the disclosure according to a third exemplary embodiment, wherein a centering screw is implemented as the component supporting the support in a centered manner relative to the crankshaft segment.
Figure 8:
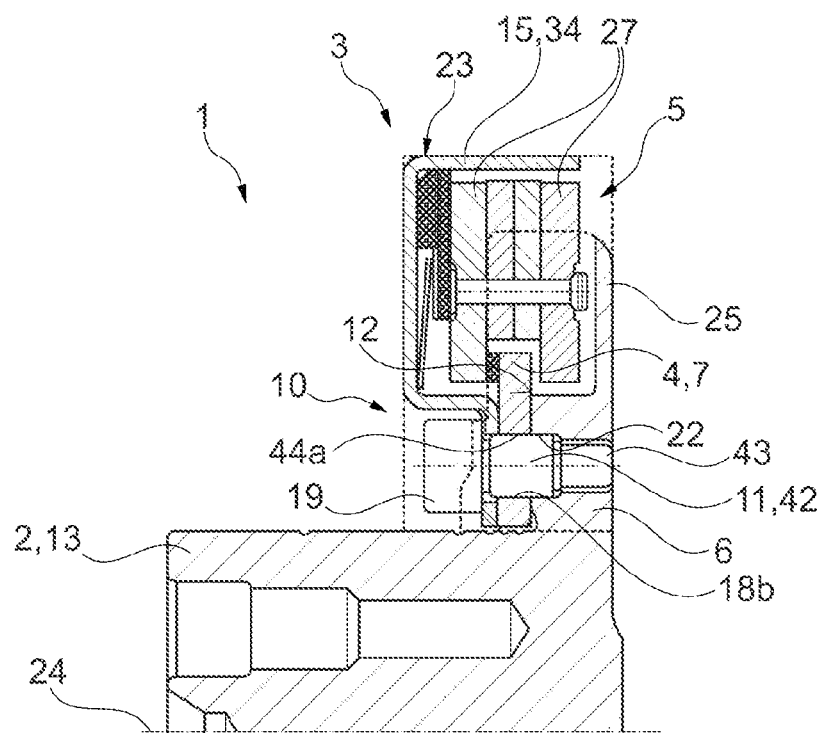
FIG. 8 shows a longitudinal sectional view of a crankshaft assembly according to the disclosure according to a fourth exemplary embodiment, in which a fitting screw is used instead of the centering screw in comparison with FIG. 7.

In FIGS. 7 and 8, it can be seen that the centering means 11 can alternatively be designed as a centering screw 41 or a fitting screw 42. In the third exemplary embodiment of FIG. 7, a centering screw 41 is provided having a threaded section 44 fixedly screwed into the crankshaft segment 2 and two fitting sections 44a, 44b each arranged toward an axial side of the threaded section 44, which fitting sections 44a, 44b are pressed into the (second) through-hole 18b of the retaining plate 7 and into the receiving hole 22 of the crankshaft segment 2. A screw head 19 of the centering screw 41 is in turn in contact with the cover 15.

In the fourth exemplary embodiment of FIG. 8, the formation of the fitting screw 42 is shown. This fitting screw 42 has only a fitting section 44a which is pressed into both the (second) through-hole 18b of the retaining plate 7 and the receiving hole 22 of the crankshaft segment 2. Further, this fitting section 44a can also be pressed into the cover 15. The threaded section 44 of the fitting screw 42 screwed into the crankshaft segment 2 is formed towards a side axially facing away from the screw head 19.

In this respect, it should also be noted that the respective screw—centering screw 41 or fitting screw 42—in further embodiments also replaces at least one fastening screw 9 or both fastening screws 9, whereby the number of circumferential positions can accordingly be reduced to four or three.

Figure 9:
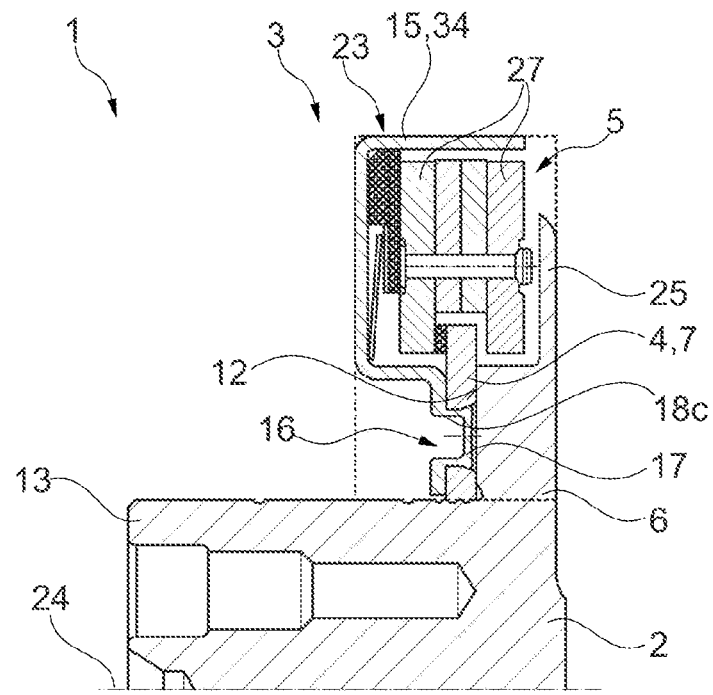
FIG. 9 shows a longitudinal sectional view of a crankshaft assembly according to the disclosure according to a fifth exemplary embodiment, wherein the receiving region of the support now has a through-hole in which a rivet projection of the cover engages.

The fifth exemplary embodiment of FIG. 9 illustrates an alternative connection of the cover 15 on the part of the support 4. The receiving region 16 has a (third) through-hole 18c into which a rivet projection 17, now directly formed on the cover 15, is pressed.

In conjunction with FIGS. 1 and 5, it should also be noted for a further alternative design that the retaining plate 7 can also be in direct radial contact with the shaft section 13/the outer lateral surface 14, instead of being at a radial distance from the shaft section 13. As a result, the radial contact between a radial inner side of the flange region 6 and the outer lateral surface 14 assumes at least part of the centering function.

In other words, the support flange (retaining plate 7) of the centrifugal pendulum is connected axially to the crankshaft. Since there is no circumferential centering seat to the crankshaft, centering is implemented via corresponding geometries of the components. In an example embodiment, five regions (circumferential positions 35a to 35e) are available in the axial contact region of the crankshaft and support flange, to which the required functions are distributed. These functions are, firstly, pre-riveting of the burst protection (cover 15) and the support flange; secondly, centering of the structure on the crankshaft; thirdly, screw connection of the structure to the crankshaft. The angular region in which the axial contact between the crankshaft and the support flange occurs can vary in size depending on the structure and can, for example, also be greater than 180°, which means that more than five regions/circumferential positions may then also be available.

In a first variant, centering nipples 21 (at least one) are provided, which are formed from the support flange and center the structure in fitting holes (receiving hole 22) in the crankshaft.

In a second variant, one or more fitting pins (centering pins 40) are used for centering.

In a third variant, a centering screw 41 (e.g. designed according to DIN EN ISO 4028) or a fitting screw 42 (e.g. designed according to DIN 609) performs the screwing and centering function.

In addition, it should generally be noted that the number of fitting connections can vary, wherein in the case of a single fitting connection, the fit between the support flange and the crankshaft can be designed to be correspondingly tight in order to limit any possible twisting about the axis of the centering geometry.

The screw head support can be provided on the burst protection. In this case, the riveting of the burst protection and support flange can be reduced, e.g. by using a rivet without a pronounced closing head. This means that no interfering contour due to a closing head is created, so more surface area is available, e.g. for the screw head support.

The screw head support can also be provided on the support flange. The riveting is then correspondingly designed to be more robust.

The attachment of the centrifugal pendulum structure is not limited to the first crankshaft cheek (first cheek 25), but can be provided elsewhere on the crankshaft if required.

LIST OF REFERENCE SYMBOLS

1 Crankshaft assembly
2 Crankshaft segment
3 Vibration damper
4 Support
5 Damping unit
6 Flange region
7 Retaining plate
8 Screw receiving hole
9 Fastening screw
10 Centering region
11 Centering means
12 End face
13 Shaft section
14 Outer lateral surface
15 Cover
16 Receiving region
17 Rivet projection
18a First through-hole
18b Second through-hole
18c Third through-hole
19 Screw head
20 Reference plane
21 Centering nipple
22 Receiving hole
23 Friction device
24 Axis of rotation
25 First cheek
26 Second cheek
27 Pendulum mass
28 Guide track
29 Guide pin
30a First partial mass
30b Second partial mass
31 Rivet connection
32 Disk spring
33 Friction element
34 Collar region
35a First circumferential position
35b Second circumferential position
35c Third circumferential position
35d Fourth circumferential position
35e Fifth circumferential position
36 Threaded section
37 Cylindrical portion
38 Bevel
39 Rounding
40 Centering pin
41 Centering screw
42 Fitting screw
43 Threaded section
44a First fitting section
44b Second fitting section

The invention claimed is:

1. A crankshaft assembly for an internal combustion engine of a motor vehicle, the crankshaft assembly comprising:
a crankshaft segment,
a vibration damper accommodated on the crankshaft segment, the vibration damper having:
a support fastened to the crankshaft segment, and a damping unit accommodated on the support; and a retaining plate secured to an end face of a flange region of the crankshaft segment, the retaining plate having:
a screw receiving hole configured for receiving a fastening screw that connects the support to the crankshaft segment; and
a centering region that is offset relative to the screw receiving hole in a circumferential direction, the centering region configured to support the support so that the support is centered relative to the crankshaft segment.

2. The crankshaft assembly according to claim 1, wherein the vibration damper is a centrifugal pendulum.

3. The crankshaft assembly according to claim 1, wherein the support: i) forms a central passage, ii) has a horseshoe-shaped extension, and iii) is axially penetrated by a shaft section of the crankshaft segment.

4. The crankshaft assembly according to claim 3, wherein the support is arranged at a radial distance from a radial outer lateral surface of the shaft section.

5. The crankshaft assembly according to claim 4, wherein a cover is secured to the support.

6. The crankshaft assembly according to claim 5, wherein a receiving region connected to the cover is provided on the retaining plate offset relative to the screw receiving hole.

7. The crankshaft assembly according to claim 6, wherein the receiving region is an axial rivet projection.

8. The crankshaft assembly according to claim 5, wherein a screw head of the fastening screw is supported on the cover.

9. The crankshaft assembly according to claim 1, wherein the centering region has a through-hole which is penetrated by a centering means anchored in the crankshaft segment.

10. The crankshaft assembly according to claim 1, wherein the centering region directly has a centering nipple formed via forming technology and the centering nipple is pressed into a receiving hole of the crankshaft segment.

11. The crankshaft assembly according to claim 3, wherein the support is in direct contact with an outer lateral surface of the shaft section.

12. The crankshaft assembly according to claim 6, wherein the receiving region is a through-hole.

13. The crankshaft assembly according to claim 5, wherein a receiving region connected to the cover is provided on the retaining plate offset relative to the centering region in the circumferential direction.

14. The crankshaft assembly according to claim 6, wherein the receiving region is offset relative to the centering region in the circumferential direction.

15. The crankshaft assembly according to claim 5, wherein a screw head of the fastening screw is supported directly on the support.

16. A crankshaft assembly for an internal combustion engine of a motor vehicle, the crankshaft assembly comprising:
a crankshaft segment;
a vibration damper arranged on the crankshaft segment, the vibration damper having:
a support fastened to the crankshaft segment, and a damping unit arranged on the support; and
a retaining plate secured to an end face of a flange region of the crankshaft segment, the retaining plate having:
a screw receiving hole configured for receiving a fastening screw that connects the support to the crankshaft segment; and
a centering region arranged offset relative to the screw receiving hole in a circumferential direction, the centering region configured to support the support so that the support is centered relative to the crankshaft segment in the circumferential direction.

17. The crankshaft assembly according to claim 16, wherein the centering region is formed integrally with the retaining plate.

18. The crankshaft assembly according to claim 17, wherein the centering region is formed as a male centering nipple.

19. The crankshaft assembly according to claim 17, wherein the centering region is disposed within a receiving hole of the crankshaft segment.

20. The crankshaft assembly according to claim 19, wherein the centering region is pressed into the receiving hole of the crankshaft segment.

* * * * *